United States Patent
Gao et al.

(10) Patent No.: US 10,070,295 B2
(45) Date of Patent: Sep. 4, 2018

(54) WARNING MESSAGE PROCESSING METHOD AND DEVICE, MME, CBC AND BASE STATION

(71) Applicant: ZTE CORPORATION, Shenzhen (CN)

(72) Inventors: Yin Gao, Shenzhen (CN); Yunlu Wu, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/322,919

(22) PCT Filed: Dec. 9, 2014

(86) PCT No.: PCT/CN2014/093400
§ 371 (c)(1),
(2) Date: May 8, 2017

(87) PCT Pub. No.: WO2015/154498
PCT Pub. Date: Oct. 15, 2015

(65) Prior Publication Data
US 2017/0251345 A1    Aug. 31, 2017

(30) Foreign Application Priority Data

Jul. 1, 2014 (CN) .......................... 2014 1 0311166

(51) Int. Cl.
*H04M 11/04* (2006.01)
*H04W 4/90* (2018.01)
(Continued)

(52) U.S. Cl.
CPC ............... *H04W 4/90* (2018.02); *H04W 4/06* (2013.01); *H04W 4/12* (2013.01); *H04W 4/22* (2013.01);
(Continued)

(58) Field of Classification Search
USPC ....................................... 455/404.1
See application file for complete search history.

(56) References Cited

U.S. PATENT DOCUMENTS 8,699,988 B2    4/2014  Roberts et al.
2007/0061155 A1*  3/2007  Ji .......................... G07B 15/063
                                                         701/2
(Continued)

FOREIGN PATENT DOCUMENTS

| CN | 101662755 A | 3/2010 |
|---|---|---|
| CN | 102006556 A | 4/2011 |
| CN | 202758464 U | 2/2013 |

OTHER PUBLICATIONS

3GPP TS 23.041 V11.6.0 (Mar. 2013) 3rd Generation Partnership Project; Technical Specification Group Core Network and Terminals; Technical realization of Cell Broadcast Service (CBS) (Release 11).*

(Continued)

*Primary Examiner* — Charles Shedrick
(74) *Attorney, Agent, or Firm* — Plumsea Law Group LLC (57) ABSTRACT

The present document provides a method and apparatus for processing a warning message, an MME, a CBC and a base station. Herein, the method includes that: a first request message for requesting for broadcasting a warning message is transmitted to a base station, herein a warning area range in the first request message includes Public Land Mobile Network (PLMN) information (S402); and a first response message sent by the base station is received, herein the first response message carries the PLMN information corresponding to issuing of the warning message (S404).

20 Claims, 7 Drawing Sheets

(51) Int. Cl.
*H04W 76/50* (2018.01)
*H04W 4/06* (2009.01)
*H04W 4/12* (2009.01)
*H04W 4/22* (2009.01)
*H04W 76/00* (2018.01)
*H04W 8/08* (2009.01)
*H04W 84/04* (2009.01)

(52) U.S. Cl.
CPC .......... *H04W 8/08* (2013.01); *H04W 76/007* (2013.01); *H04W 76/50* (2018.02); *H04W 84/042* (2013.01)

(56) References Cited

U.S. PATENT DOCUMENTS

| | | | | |
|---|---|---|---|---|
| 2008/0267114 | A1* | 10/2008 | Mukherjee | H04L 63/107 370/315 |
| 2013/0295873 | A1* | 11/2013 | Yabuki | H04W 4/06 455/404.1 |
| 2014/0018031 | A1* | 1/2014 | Ode | H04W 4/22 455/404.1 |
| 2014/0171012 | A1* | 6/2014 | Roberts | H04J 11/0093 455/404.1 |
| 2014/0179258 | A1* | 6/2014 | Arzelier | H04W 4/22 455/404.1 |
| 2014/0357183 | A1* | 12/2014 | Rathonyi | G08B 27/008 455/3.01 |
| 2016/0112857 | A1* | 4/2016 | Wu | H04W 4/22 455/404.1 |
| 2017/0086047 | A1* | 3/2017 | Buckley | H04W 4/22 |
| 2017/0142560 | A1* | 5/2017 | Ryu | H04W 4/08 |

OTHER PUBLICATIONS

PCT International Search Report dated Mar. 13, 2015, Application No. PCT/CN2014/093400, 4 Pages.

PCT Written Opinion of the International Searching Authority dated Mar. 13, 2015, Application No. PCT/CN2014/093400, Applicant ZTE Corporation, 5 Pages.

"3rd Generation Partnership Project; Technical Specification Group Radio Access Network; Evolved Universal Terrestrial Radio Access Network (E-UTRAN); S1 Application Protocol (S1AP) (Release 12)", 3GPP TS 36.413, V12.2.0 (Jun. 2014), XP050774364, 285 Pages.

"3rd Generation Partnership Project; Technical Specification Group Core Network and Terminals; Technical realization of Cell Broadcast Service (CBS) (Release 12)", 3GPP TS 23.041, V12.6.0 (Jun. 2014), XP050774196, 68 Pages.

Extended European Search Report dated Apr. 18, 2017, Application No. 14888814.2-1870 / 3166341, Applicant ZTE Corporation, 7 Pages.

* cited by examiner

WARNING MESSAGE PROCESSING METHOD AND DEVICE, MME, CBC AND BASE STATION

CROSS-REFERENCE TO RELATED APPLICATIONS

This application is a U.S. national phase of PCT Application No. PCT/CN2014/093400 filed on Dec. 9, 2014, which claims priority to Chinese Patent Application No. 201410311166.5 filed on Jul. 1, 2014, the disclosures of which are incorporated in their entirety by reference herein.

TECHNICAL FIELD

The present document relates to the field of communication, and more particularly to a method and apparatus for processing a warning message, a Mobility Management Entity (MME), a Cell Broadcast Center (CBC) and a base station.

BACKGROUND

A Public Warning System (PWS) is a system for warning about disasters and other emergencies. In case of a disaster such as an earthquake, a tsunami, a hurricane and a wildfire, a PWS may timely and accurately publish a warning message to a user to enable the user to take a proper action to protect himself/herself and his/her family from serious injuries or death or avoid heavy property loss. A PWS defined in the 3rd Generation Partnership Project (3GPP) may be applied to different communication systems, for example: a Global System of Mobile Communication (GSM), a Universal Mobile Telecommunication System (UMTS) and Long Term Evolution (LTE). PWSs include Earthquake and Tsunami Warning System (ETWSs), Commercial Mobile Alert Systems (CMASs) and Emergency Alert Systems (EASs).

Figure 1:
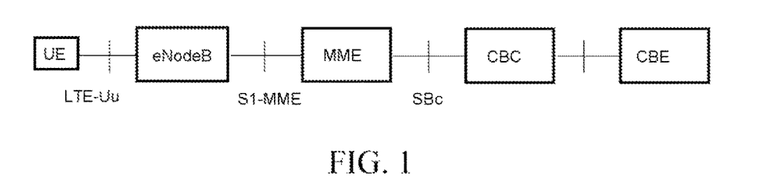
FIG. 1 is a schematic diagram of a network architecture of a PWS in an E-UTRAN according to the related art.

In an Evolved Universal Mobile Telecommunications System Terrestrial Radio Access Network (E-UTRAN) of LTE, a basic network architecture of a PWS is shown in FIG. 1 (FIG. 1 is a schematic diagram of a network architecture of a PWS in an E-UTRAN according to a related art). In the network architecture, a Cell Broadcast Entity (CBE) does not belong to a scope of a communication network defined by the 3GPP, and is mainly responsible for formatting a Cell Broadcast Service (CBS) message. A Cell Broadcast Center (CBC) is a part of a core network, and the CBC is responsible for managing the CBS message, including: allocating a serial number, modifying or deleting the CBS message of an Evolved NodeB (eNB), determining a cell to which the CBS message is broadcasted, determining a time when the CBS message is started to be broadcasted, determining a time when the CBS message is killed to be broadcasted, determining a broadcast period of the CBS message, and the like. Besides general functions, an Mobility Management Entity (MME) is also responsible for: explaining a command from the CBC, storing the message from the CBC, providing a CBC confirmation after successfully completing execution of the command received from the CBC, reporting a CBC failure when the command received from the CBC is not understood or executed, and routing a warning message to a proper eNB in an indicated Tracking Area (TA). The eNB is mainly responsible for broadcasting the warning message received from the MME to User Equipment (UE) residing in a related area belonging to the eNB its own. The CBC may be connected with multiple MMEs, and may also be connected with multiple CBEs. The CBC is connected to the MME through an SBc interface. The MME is connected to the eNB through an S1-MME interface. The eNB is connected to the UE through a Uu interface. An interface between the CBE and the CBC is not included within a scope of a 3GPP standard.

During practical networking, network sharing is originated from a solution released by an operating company to alleviate pressure in case of financial strains caused by huge fees for license plates in Europe. It enables operating companies to cooperate in construction of a communication network and simultaneously flexibly manage own parts. Therefore, a network construction period is greatly shortened, and moreover, Total Cost of Ownership (TCO) is greatly reduced. At the same time, network sharing may promote optimal configuration of resources, avoid repeated construction and implement value maintenance and appreciation of assets. Network sharing is becoming an important issue in network construction. There are many implementation methods for network sharing, including access network sharing, which refers to that multiple operating companies have a radio access network in a shared area as well as respectively independent core networks and service networks. Multiple core network operating companies sharing an access network have own independent mobile network Identifiers (IDs) and operating company IDs. CBC sharing may also be considered in a warning system, and refers to that multiple operating companies share the same CBC in an area.

Figure 2:
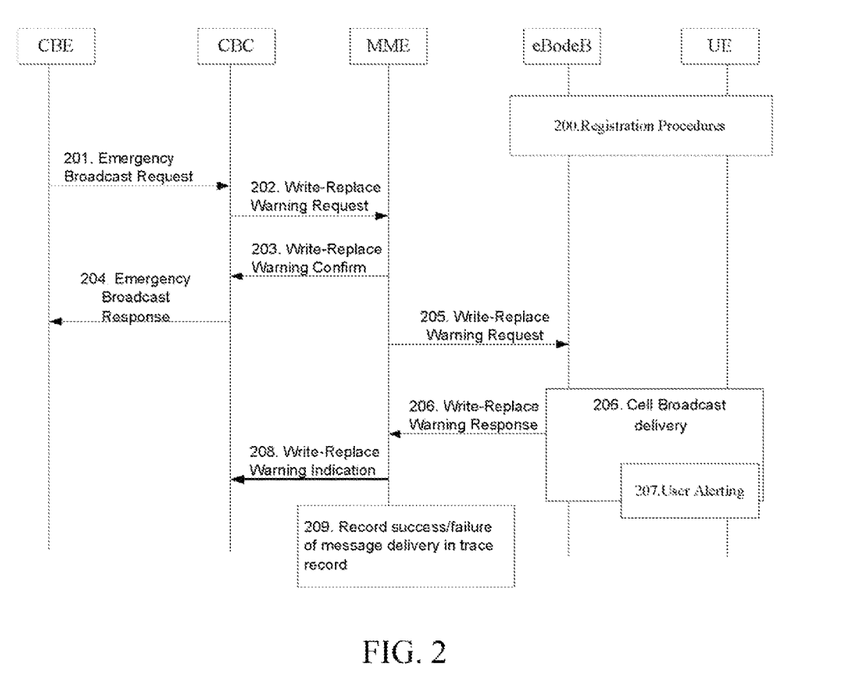
FIG. 2 is a flowchart of issuing a warning message in an E-UTRAN according to the related art.
Figure 3:
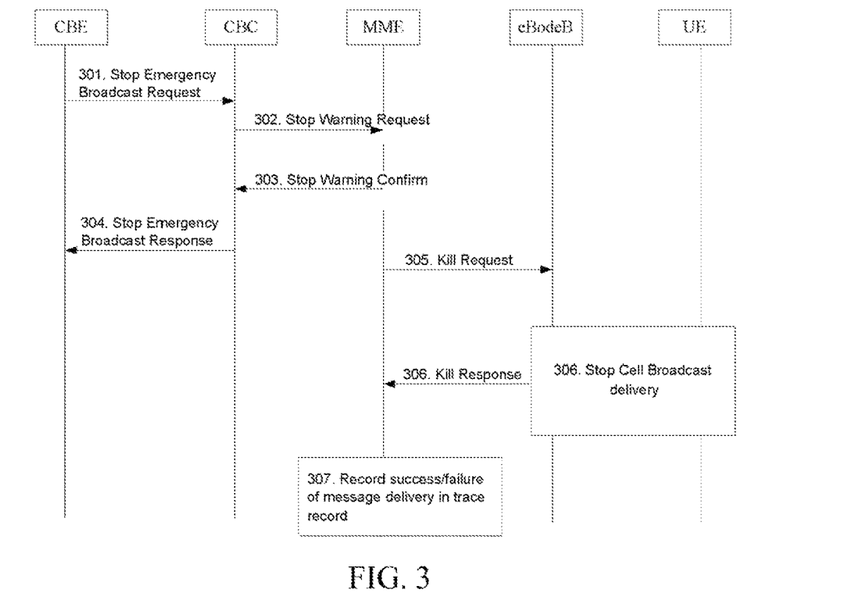
FIG. 3 is a flowchart of stopping a warning message in an E-UTRAN according to the related art.

In case of sharing of multiple operating companies, when a warning message is transmitted and killed, FIG. 2 is a flowchart of issuing a warning message in an E-UTRAN according to the related art, and FIG. 3 is a flowchart of stopping a warning message in an E-UTRAN according to the related art, as shown in FIG. 2 and FIG. 3. In the related technology, a CBC identifies an MME to which a warning message is required to be sent; the CBC sends a write-replace warning request message to the MME, the message including the broadcasted warning message and a transmission attribute (including a Message identifier, a serial number, a Tracking Area ID list which is only used at the MME and is used by the MME to select an eNB to which the write-replace warning request message is to be forwarded, and a warning area which is a cell ID list or a Tracking Area ID list or one or more emergency area IDs), the MME starts transmitting the warning message to the eNB, and the eNB determines a cell to which the warning message is to be broadcasted by virtue of warning area information; and the eNB returns a distribute warning message response message to the MME. A kill flow of the warning message is similar, and the CBC identifies an MME to which a stop warning message is required to be sent; and the CBC sends a stop write-replace warning request message to the MME, herein the message includes: a message identifier, a serial number, a Tracking Area ID list and a warning area. The MME sends a kill request message to the eNB; and the MME determines the eNB which is broadcasting the warning message by virtue of the Tracking Area ID list. The eNB kills the warning message which is identified by the message identifier and the serial number and is being broadcasted in an area identified by a warning area ID; and the eNB returns a kill response message to the MME. However, there are no considerations made about a network sharing scenario in the related technology, and an applicable Public Land Mobile Network (PLMN) range of a warning area is unidentified in warning message signaling.

Therefore, in the related technology, there exists a problem that a PLMN range applicable to a warning area cannot be identified in warning message signaling, i.e. warning by distinguishing PLMNs cannot be performed in a network sharing environment.

SUMMARY

The present document provides a method and apparatus for processing a warning message, an MME, a CBC and a base station, so as to at least solve the problem in the related technology that warning by distinguishing PLMNs cannot be performed in a network sharing environment.

According to an aspect of the present document, a method for processing a warning message is provided, which includes: issuing a first request message for requesting for broadcasting a warning message to a base station, herein a warning area range in the first request message includes Public Land Mobile Network, PLMN, information; and receiving a first response message sent by the base station, herein the first response message carries the PLMN information corresponding to issuing of the warning message.

Alternatively, after issuing the first request message for requesting for broadcasting the warning message to the base station, the method further includes: sending a second request message for requesting for stopping broadcasting the warning message to the base station; and receiving a second response message sent by the base station, herein the second response message carries PLMN information corresponding to stopping broadcasting of the warning message.

Alternatively, before issuing the first request message for requesting for broadcasting the warning message to the base station, the method further includes at least one of: acquiring the PLMN information comprised in the warning area range from a Cell Broadcast Center, CBC, through an SBc interface; and acquiring the PLMN information comprised in the warning area range through locally stored CBC configuration information.

Alternatively, the PLMN information includes at least one of: a PLMN list; a combination of the PLMN list and at least one of: a cell Identifier (ID) list, a Tracking Area ID list, an emergency area ID list, and indication information about broadcasting with a PLMN range.

According to another aspect of the present document, a method for processing a warning message is provided, which includes: issuing a first request message for requesting for broadcasting a warning message to a Mobility Management Entity, MME, wherein a warning area range in the first request message comprises Public Land Mobile Network, PLMN, information; and receiving a confirm message sent by the MME, herein the confirm message carries at least one of: the PLMN information corresponding to issuing of the warning message, PLMN information unidentified by the MME, and corresponding PLMN information unable to be sent by the MME.

According to another aspect of the present document, a method for processing a warning message is provided, which includes: receiving a first request message used for requesting for broadcasting a warning message and issued by a Mobility Management Entity, MME, herein a warning area range in the first request message comprises Public Land Mobile Network, PLMN, information; and sending a first response message to the MME, wherein the first response message carries the PLMN information corresponding to issuing of the warning message.

Alternatively, after receiving the first request message used for requesting for broadcasting the warning message and issued by the MME, the method further includes: receiving a second request message used for requesting for stopping broadcasting the warning message and sent by the MME; and sending a second response message to the MME, herein the second response message carries PLMN information corresponding to stopping broadcasting of the warning message.

According to another aspect of the present document, a apparatus for processing a warning message is provided, which includes: a first sending module, arranged to issue a first request message for requesting for broadcasting a warning message to a base station), herein a warning area range in the first request message comprises Public Land Mobile Network, PLMN, information; and a first receiving module, arranged to receive a first response message sent by the base station, herein the first response message carries the PLMN information corresponding to issuing of the warning message.

Alternatively, the apparatus further includes: a second sending module, arranged to send a second request message for requesting for stopping broadcasting the warning message to the base station; and a second receiving module, arranged to receive a second response message sent by the base station, herein the second response message carries PLMN information corresponding to stopping broadcasting of the warning message.

Alternatively, the apparatus further includes at least one of: a first acquisition module, arranged to acquire the PLMN information included in the warning area range from a Cell Broadcast Center, CBC, through an SBc interface; and a second acquisition module, arranged to acquire the PLMN information included in the warning area range through locally stored CBC configuration information.

According to another aspect of the present document, an MME is provided, which includes any abovementioned apparatus.

According to another aspect of the present document, a apparatus for processing a warning message is provided, which includes: a third sending module, arranged to issue a first request message for requesting for broadcasting a warning message to a Mobility Management Entity, MME, herein a warning area range in the first request message includes Public Land Mobile Network, PLMN, information; and a third receiving module, arranged to receive a confirm message sent by the MME, herein the confirm message carries at least one of: the PLMN information corresponding to issuing of the warning message, PLMN information unidentified by the MME, and corresponding PLMN information unable to be sent by the MME.

According to another aspect of the present document, a CBC is provided, which includes the abovementioned apparatus.

According to another aspect of the present document, a apparatus for processing a warning message is provided, which includes: a fourth receiving module, arranged to receive a first request message used for requesting for broadcasting a warning message and issued by a Mobility Management Entity, MME, herein a warning area range in the first request message includes Public Land Mobile Network, PLMN, information; and a fourth sending module, arranged to send a first response message to the MME, herein the first response message carries the PLMN information corresponding to issuing of the warning message.

Alternatively, the apparatus further includes: a fifth receiving module, arranged to receive a second request message used for requesting for stopping broadcasting the warning message and sent by the MME; and a fifth sending module, arranged to send a second response message to the MME, herein the second response message carries PLMN information corresponding to stopping broadcasting of the warning message.

According to another aspect of the present document, a base station is provided, which includes any abovementioned apparatus.

According to the present document, the following solution is adopted: issuing the first request message for requesting for broadcasting the warning message to the base station, herein, the warning area range in the first request message includes the PLMN information; and receiving the first response message sent by the base station, herein, the first response message carries the PLMN information corresponding to a PLMN to which the warning message is issued. The problem that warning by distinguishing PLMNs cannot be performed in a network sharing environment in the related technology is solved, and effects of processing the warning message according to the PLMNs in the network sharing environment and better perfecting a warning system are further achieved.

BRIEF DESCRIPTION OF DRAWINGS

The accompanying drawings described here are adopted to provide a further understanding to the present document, and form a part of the present application. Schematic embodiments of the present document and descriptions thereof are adopted to explain the present document and not intended to form improper limits to the present document. In the accompanying drawings.

DETAILED DESCRIPTION

The present document will be described below with reference to the drawings and embodiments in detail. It is important to note that the embodiments in the present application and characteristics in the embodiments may be combined with each other under the condition of no conflicts.

Figure 4:
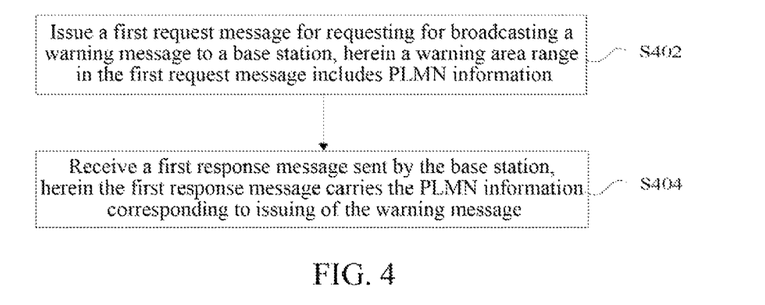
FIG. 4 is a flowchart of a first method for processing a warning message according to an embodiment of the present document.

The embodiment provides a method for processing a warning message. FIG. 4 is a flowchart of a first method for processing a warning message according to an embodiment of the present document, and as shown in FIG. 4, the flow includes the following steps.

In step S402: a first request message for requesting for broadcasting a warning message is issued to a base station, herein a warning area range in the first request message includes PLMN information. It is important to note that the PLMN information may adopt multiple forms, and for example, may include at least one of: a PLMN list; and a combination of the PLMN list and at least one of: a cell ID list, a TA ID list, an emergency area ID list and indication information about broadcasting with a PLMN range.

In step S404: a first response message sent by the base station is received, herein the first response message carries the PLMN information corresponding to issuing of the warning message.

By the abovementioned steps, for an MME, the PLMN information is carried in the warning area range, so that the MME may acquire a issuing range of the warning message more effectively, the problem that warning by distinguishing PLMNs cannot be performed in a network sharing environment in the related technology is solved, and effects of processing the warning message according to the PLMNs in the network sharing environment and better perfecting a warning system are further achieved.

Correspondingly, after the request message for requesting for broadcasting the warning message is normally issued to the base station, a flow of stopping issuing of the related warning message is further executed, and for example, the following processing may be adopted: a second request message for requesting for stopping broadcasting the warning message is sent to the base station; and a second response message sent by the base station is received, herein the second response message carries PLMN information corresponding to stopping broadcasting of the warning message.

Herein, before the first request message for requesting for broadcasting the warning message is issued to the base station, the PLMN information may further be acquired in at least one of the following manners. For example, the PLMN information included in the warning area range may be acquired from a CBC through an SBc interface; and the PLMN information included in the warning area range may also be acquired through locally stored CBC configuration information.

Figure 5:
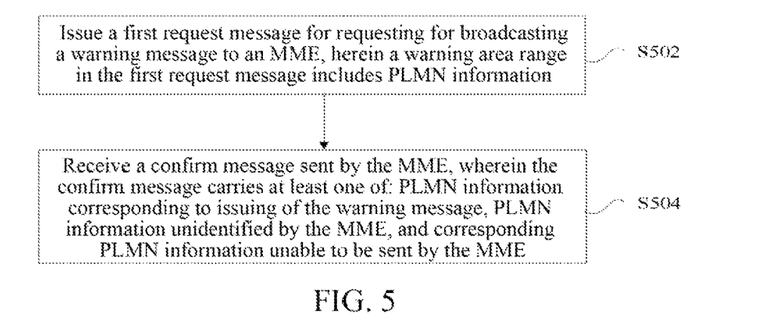
FIG. 5 is a flowchart of a second method for processing a warning message according to an embodiment of the present document.

The embodiment also provides a method for processing a warning message. FIG. 5 is a flowchart of a second method for processing a warning message according to an embodiment of the present document, and as shown in FIG. 5, the flow includes the following steps.

In step S502: a first request message for requesting for broadcasting a warning message is issued to an MME, herein a warning area range in the first request message includes PLMN information.

In step S504: a confirm message sent by the MME is received, herein the confirm message carries at least one of: PLMN information corresponding to issuing of the warning message, PLMN information unidentified by the MME and corresponding PLMN information unable to be sent by the MME.

By the abovementioned steps, for a CBC, the PLMN information is carried in the warning area range, so that the MME may acquire a issuing range of the warning message more effectively, the problem that warning by distinguishing PLMNs cannot be performed in a network sharing environment in the related technology is solved, and effects of processing the warning message according to the PLMNs in the network sharing environment and better perfecting a warning system are further achieved.

Figure 6:
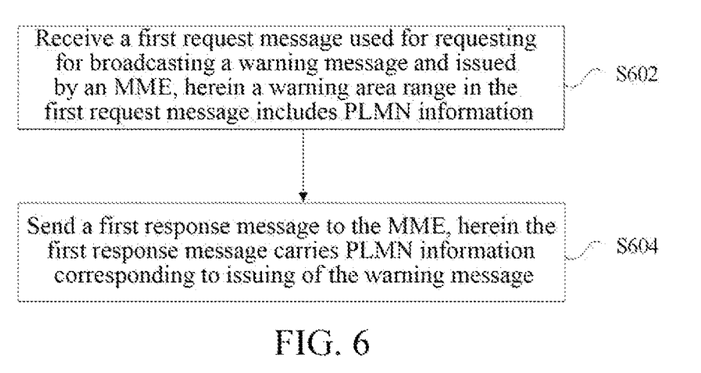
FIG. 6 is a flowchart of a third method for processing a warning message according to an embodiment of the present document.

The embodiment further provides a method for processing a warning message, FIG. 6 is a flowchart of a third method for processing a warning message according to an embodiment of the present document, and as shown in FIG. 6, the flow includes the following steps.

In step S602: a first request message used for requesting for broadcasting a warning message and issued by an MME is received, herein a warning area range in the first request message includes PLMN information.

In step S604: a first response message is sent to the MME, herein the first response message carries PLMN information corresponding to issuing of the warning message.

By the abovementioned steps, for an base station, the PLMN information is carried in the warning area range, so that the base station may process the warning message based on distinguishing PLMNs, the problem that warning by distinguishing PLMNs cannot be performed in a network sharing environment in the related technology is solved, and effects of processing the warning message according to the PLMNs in the network sharing environment and better perfecting a warning system are further achieved.

Alternatively, after the step that the first request message used for requesting for broadcasting the warning message and issued by the MME is received, processing of stopping broadcasting of the warning message may also correspondingly be performed. For example, the processing can be implemented in the following manner—a second request message used for requesting for stopping broadcasting of the warning message and sent by the MME is received; and a second response message is sent to the MME, herein the second response message carries PLMN information corresponding to stopping broadcasting of the warning message.

The embodiment further provides an apparatus for processing a warning message, the apparatus is configured to implement the abovementioned embodiment and alternative implementation modes, and what has been described will not be elaborated. For example, term "module", used below, may implement a combination of software and/or hardware with a preset function. Although the apparatus described in the following embodiment is alternatively implemented with software, implementation with hardware or a software and hardware combination is also possible and conceivable.

Figure 7:
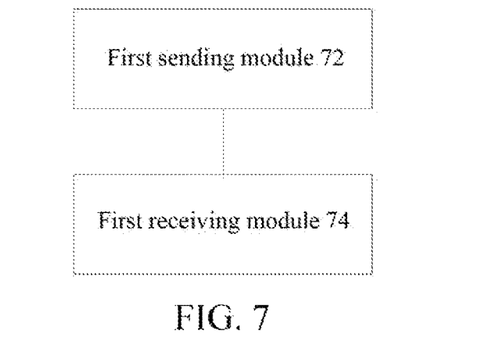
FIG. 7 is a structure block diagram of a first apparatus for processing a warning message according to an embodiment of the present document.

FIG. 7 is a structure block diagram of a first apparatus for processing a warning message according to an embodiment of the present document, and as shown in FIG. 7, the apparatus includes a first sending module 72 and a first receiving module 74. The apparatus will be described below.

The first sending module 72 is arranged to transmit a first request message for requesting for broadcasting a warning message to a base station, herein a warning area range in the first request message includes PLMN information; and the first receiving module 74 is connected to the abovementioned first sending module 72, and is arranged to receive a first response message sent by the base station, herein the first response message carries the PLMN information corresponding to issuing of the warning message.

Figure 8:
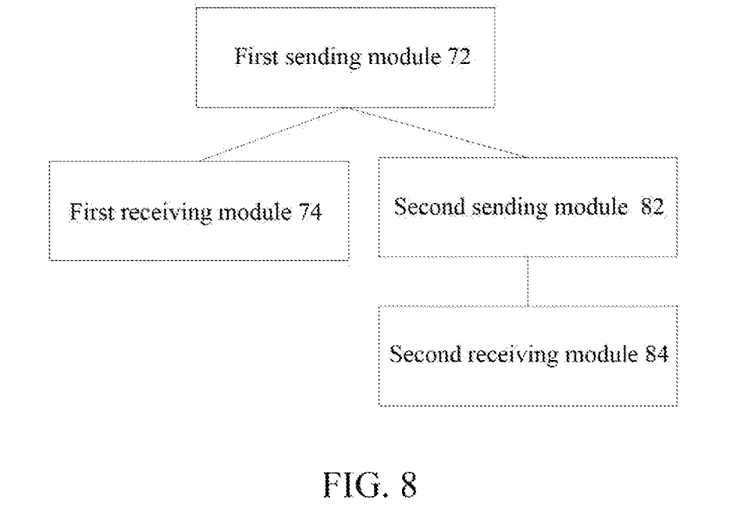
FIG. 8 is a first alternative structure block diagram of a first apparatus for processing a warning message according to an embodiment of the present document.

FIG. 8 is a first alternative structure block diagram of a first apparatus for processing a warning message according to an embodiment of the present document, and as shown in FIG. 8, the apparatus further includes a second sending module 82 and a second receiving module 84, besides all the modules shown in FIG. 7. The apparatus will be described below.

The second sending module 82 is connected to the abovementioned first sending module 72, and is arranged to send a second request message for requesting for stopping broadcasting the warning message to the base station; and the second receiving module 84 is connected to the abovementioned second sending module 82, and is arranged to receive a second response message sent by the base station, herein the second response message carries PLMN information corresponding to stopping broadcasting of the warning message.

Figure 9:
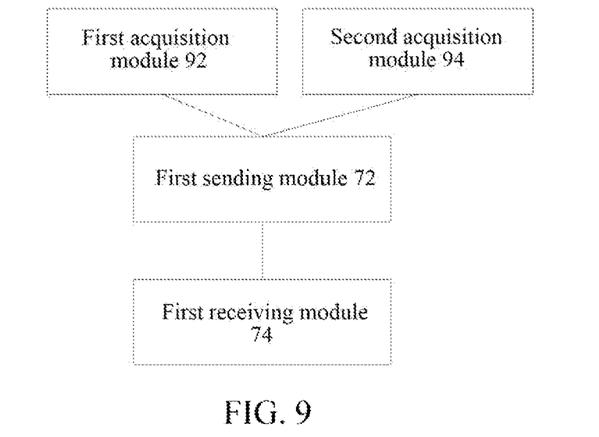
FIG. 9 is a second alternative structure block diagram of a first apparatus for processing a warning message according to an embodiment of the present document.

FIG. 9 is a second alternative structure block diagram of a first apparatus for processing a warning message according to an embodiment of the present document, and as shown in FIG. 9, the apparatus further includes at least one of: a first acquisition module 92 and a second acquisition module 94, besides all the modules shown in FIG. 7. The alternative structure will be described below.

The first acquisition module 92 is arranged to acquire the PLMN information included in the warning area range from a CBC through an SBc interface; and the second acquisition module 94 is arranged to acquire the PLMN information included in the warning area range through locally stored CBC configuration information.

Figure 10:
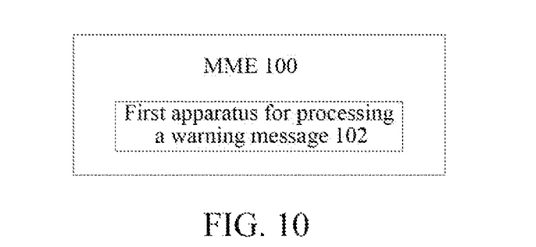
FIG. 10 is a structure block diagram of an MME according to an embodiment of the present document.

FIG. 10 is a structure block diagram of an MME according to an embodiment of the present document, and as shown in FIG. 10, the MME 100 includes any abovementioned first apparatus 102 for processing the warning message.

Figure 11:
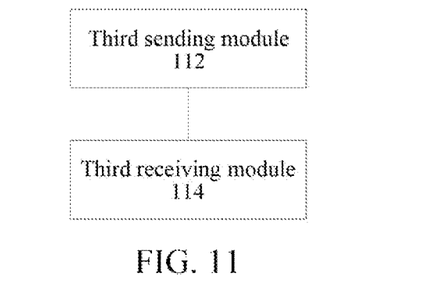
FIG. 11 is a structure block diagram of a second apparatus for processing a warning message according to an embodiment of the present document.

FIG. 11 is a structure block diagram of a second apparatus for processing a warning message according to an embodiment of the present document, and as shown in FIG. 11, the apparatus includes a third sending module 112 and a third receiving module 114. The apparatus will be described below.

The third sending module 112 is arranged to issue a first request message for requesting for broadcasting a warning message to an MME, herein a warning area range in the first request message includes PLMN information; and the third receiving module 114 is arranged to receive a confirm message sent by the MME, herein the confirm message carries at least one of: the PLMN information corresponding to issuing of the warning message, PLMN information unidentified by the MME and corresponding PLMN information unable to be sent by the MME.

Figure 12:
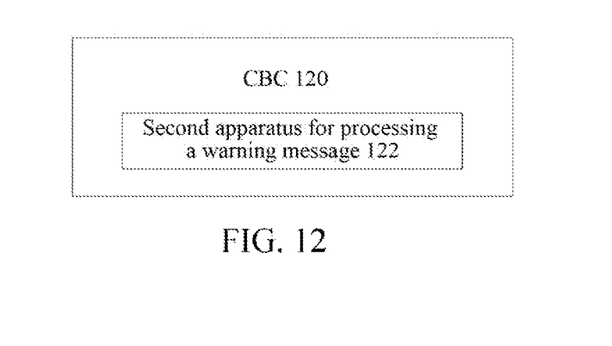
FIG. 12 is a structure block diagram of a CBC according to an embodiment of the present document.

FIG. 12 is a structure block diagram of a CBC according to an embodiment of the present document, and as shown in FIG. 12, the CBC 120 includes any abovementioned second apparatus 122 for processing the warning message.

Figure 13:
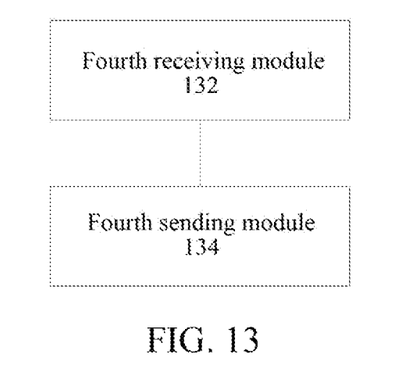
FIG. 13 is a structure block diagram of a third apparatus for processing a warning message according to an embodiment of the present document.

FIG. 13 is a structure block diagram of a third apparatus for processing a warning message according to an embodiment of the present document, and as shown in FIG. 13, the apparatus includes: a fourth receiving module 132 and a fourth sending module 134. The apparatus will be described below.

The fourth receiving module 132 is arranged to receive a first request message used for requesting for broadcasting a warning message and issued by an MME, herein a warning area range in the first request message includes PLMN information; and the fourth sending module 134 is connected to the abovementioned fourth receiving module 132, and is arranged to send a first response message to the MME, herein the first response message carries the PLMN information corresponding to issuing of the warning message.

Figure 14:
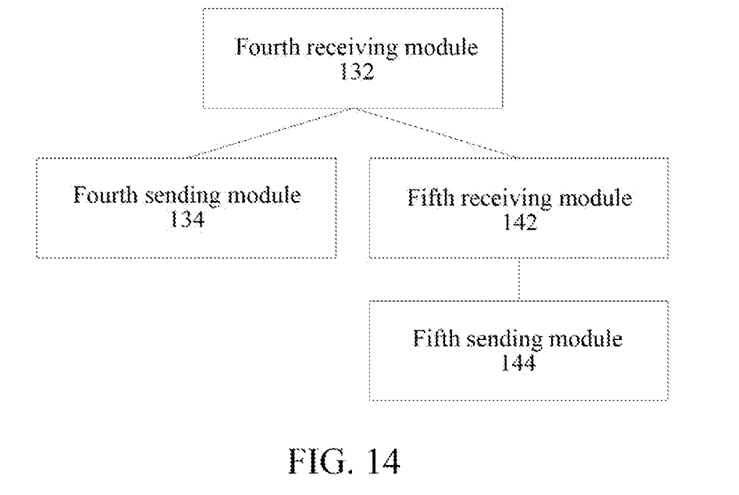
FIG. 14 is an alternative structure block diagram of a third apparatus for processing a warning message according to an embodiment of the present document.

FIG. 14 is a alternative structure block diagram of a third apparatus for processing a warning message according to an embodiment of the present document, and as shown in FIG. 14, the apparatus further includes a fifth receiving module 142 and a fifth sending module 144, besides all the modules shown in FIG. 13. The alternative structure will be described below.

The fifth receiving module 142 is connected to the abovementioned fourth receiving module 132, and is arranged to receive a second request message used for requesting for stopping broadcasting of the warning message and sent by the MME; and the fifth sending module 144 is connected to the abovementioned fifth receiving module 142, and is arranged to send a second response message to the MME, herein the second response message carries PLMN information corresponding to stopping broadcasting of the warning message.

Figure 15:
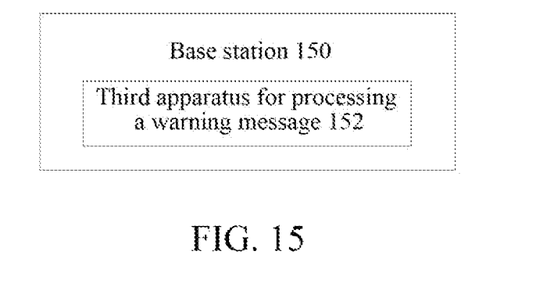
FIG. 15 is a structure block diagram of a base station according to an embodiment of the present document.

FIG. 15 is a structure block diagram of a base station according to an embodiment of the present document, and as shown in FIG. 15, the base station 150 includes any abovementioned third apparatus 152 for processing the warning message.

For the problem of how to implement effective issuing and stopping of a warning message during network sharing in the related technology, a warning system is better fully implemented in disasters and emergencies. In the embodiment, a warning area range of the warning message is managed in the following manner—descriptions will be made below with a network sharing condition of an LTE/LTE-Advanced (LTE-A) system as an example.

The warning area range is required to include applicable PLMN list information, and may adopt a representation form of one or a combination of:
  1) a cell ID list;
  2) a TA ID list;
  3) an emergency area ID list;
  4) a PLMN list; and
  5) indication information about broadcasting with a PLMN range.

For example, 3) and 4) may be combined to indicate processing of the warning message in one or more emergency areas in the range of PLMN list. For example, 4) and 5) may be combined to indicate that only processing of the warning message in a range of the PLMN list is considered. Except 5), 1), 2), 3) and 4) may all be used independently to indicate corresponding warning area ranges of the warning message.

Descriptions will be made below for issuing and stopping of a warning message respectively.

A method for issuing a warning message:

In step 1): an MME sends a write-replace warning request message to an eNB to request for issuing a warning message for broadcasting. The message may include an attribute of the warning message, for example: a message identifier IE and serial number IE identifying the warning message, and/or a warning area IE indicating a warning area of the warning message, and/or a Repetition Period IE indicating a broadcast period of the warning message, and/or a Number of Broadcast Requested IE indicating the number of broadcasting times of the message. Herein, warning area information may be extended in the abovementioned manner.

In step 2): the eNB sends a write-replace warning response message to the MME. The message includes the message identifier IE and serial number IE identifying the warning message, and/or a warning area information, i.e. a broadcast completed area list IE, indicating successful completion of issuing of the warning message. Herein, the warning area information for successful completion of issuing of the warning message is optionally added with PLMN list information, which indicates a PLMN range where issuing of the warning message has been completed.

A method for stopping the warning message:

In step 1): the MME sends a kill request message to the eNB to request for stopping broadcasting of the warning message. The message may include the attribute of the warning message, for example: the message identifier IE and serial number IE identifying the warning message, and/or a warning area IE indicating a warning area where the warning message is stopped, and/or a kill-all warning messages indicator indicating whether to stop all warning messages in the eNB or not. Herein, warning area information may be extended in the abovementioned manner.

In step 2): the eNB sends a kill response message to the MME. The message includes the message identifier IE and serial number IE identifying the warning message, and/or warning area information, i.e. a broadcast cancelled area list IE, indicating cancellation of the warning message. Herein the warning area information indicating cancellation of the warning message may be optionally added with PLMN list information, which indicates a PLMN range where issuing of the warning message has been cancelled.

Alternatively, if a current CBC is shared by multiple operating companies, the MME is required to make sure a warning area issuing range corresponding to the warning message when receiving the warning message issued by the CBC, and in a network sharing scenario, the MME may acquire it through an SBc interface information or acquire it through locally connected CBC configuration information.

It is important to note that it is also necessary to consider PLMN related information for processing in a failure scenario. The abovementioned method may be implemented through an S1 interface. In addition, the abovementioned method for managing the warning area range of the warning message may also be applied to another similar network system such as an UTRAN system.

On the basis of the abovementioned implementation manner for the warning area range of the warning message and a consideration about addition of the warning area range of the warning message in an interface message for sharing broadcasting of the warning message to multiple operating companies, the MME and the eNB may acquire the issuing range of the warning message more effectively and provide a more complete solution for implementing the warning system in the network sharing scenario.

The method may implement effective management over issuing and stopping of the warning message in the network sharing scenario, so that a core network and the eNB may provide the more complete solution for implementing the warning system in the network sharing scenario according to the warning area range of the warning message, warning message issuing and stopping ranges are enhanced, a utilization rate of a shared network resource is increased, network performance is improved, and implementation of the warning system in the network sharing scenario is met.

Descriptions will be made below with reference to alternative implementation modes of the present document.

Figure 16:
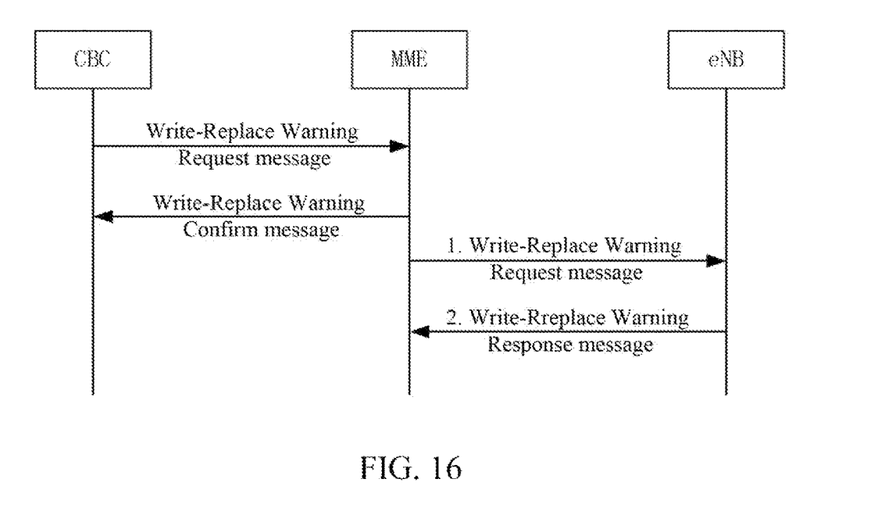
FIG. 16 is a flowchart of issuing a warning message according to a first alternative embodiment of the present document.

FIG. 16 is a flowchart of issuing a warning message according to a first alternative embodiment of the present document, and as shown in FIG. 16, the flow is described as follows.

1) An MME sends a write-replace warning request message to an eNB to request for issuing a warning message for broadcasting. The message may include an attribute of the warning message, for example: a message identifier IE and serial number IE identifying the warning message, and/or a warning area IE indicating a warning area of the warning message, and/or a repetition period IE indicating a broadcast period of the warning message, and/or a number of broadcast requested IE indicating the number of broadcasting times of the message. Herein, warning area information may be extended in the abovementioned manner.

2) The eNB sends a write-replace warning response message to the MME. The message includes the message identifier IE and serial number IE identifying the warning message, and/or warning area information, i.e. a broadcast completed area list IE, indicating successful completion of issuing of the warning message. Herein, the warning area information for successful completion of issuing of the warning message can be added with PLMN list information, which indicates a PLMN range where issuing of the warning message has been completed.

Herein, a flow of interaction between a CBC and the MME in the alternative embodiment mainly includes operations below.

(1) The CBC sends a write-replace warning request message to the MME, and the message may be 202 shown in FIG. 2. Besides the broadcasted warning message and a issuing attribute (including a message identifier, a serial number, a Tracking Area ID list which is only used at the MME and is used by the MME to select an eNB to which the write-replace warning request message is to be forwarded, and a warning area which is a cell ID list or a TA ID list or one or more emergency area IDs), the method may further include a PLMN list which permits the warning message to be broadcasted.

(2) The MME sends a write-replace warning confirm message to the CBC, and the message may be 203 shown in FIG. 2, and indicates that the MME has started allocating the warning message to the eNB; and the write-replace warning confirm message may include an unknown Tracking Area list IE, herein the unknown Tracking Area list IE identifies Tracking Areas unknown to the MME and unreachable for the request. Herein, unknown PLMN list information is optionally included to indicate PLMN areas unknown to the MME and unreachable for the request.

Figure 17:
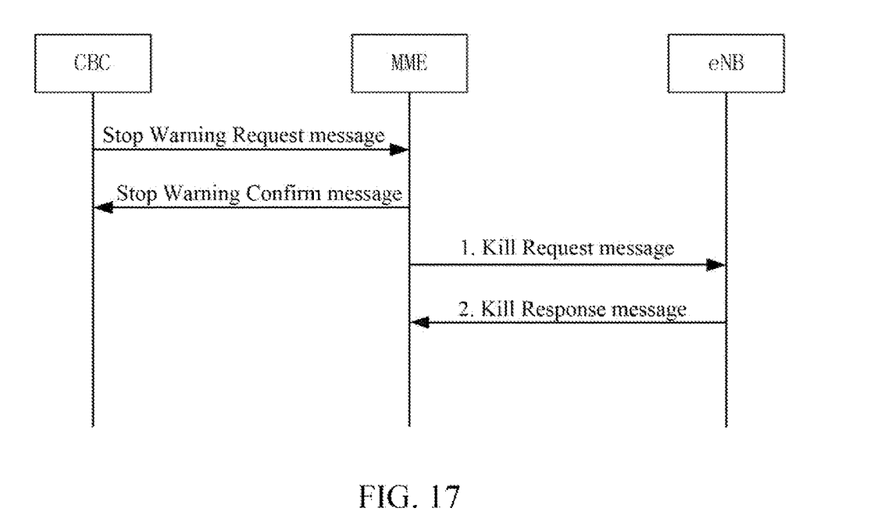
FIG. 17 is a flowchart of stopping a warning message according to a second alternative embodiment of the present document.

FIG. 17 is a flowchart of stopping a warning message according to a second alternative embodiment of the present document, and as shown in FIG. 17, the flow is described as follows.

1) An MME sends a kill request message to an eNB to request for stopping broadcasting of a warning message. The message may include an attribute of the warning message, for example: a message identifier IE and serial number IE identifying the warning message, and/or a warning area IE indicating a warning area where the warning message is stopped, and/or a kill-all warning messages indicator indicating whether to stop all warning messages in the eNB or not. Herein, warning area information may be extended in the abovementioned manner.

2) The eNB sends a kill response message to the MME. The message includes the message identifier IE and serial number IE identifying the warning message, and/or warning area information, i.e. a broadcast cancelled area list IE, indicating cancellation of the warning message. Herein the warning area information indicating cancellation of the warning message may be optionally added with PLMN list information, which indicates a PLMN range where issuing of the warning message has been cancelled.

Herein, a flow of interaction between a CBC and the MME in the alternative embodiment mainly includes operations below.

(1) The CBC sends a stop write-replace warning request message to the MME, and the message may be 302 shown in FIG. 3. Herein, the message includes: a message identifier, a serial number, a Tracking Area ID list and a warning area, and may further include a PLMN list which permits the warning message to be broadcasted.

(2) The MME sends a stop warning confirm message, herein the message is configured to indicate the CBC that the MME has started allocating a kill request message to the eNB.

Figure 18:
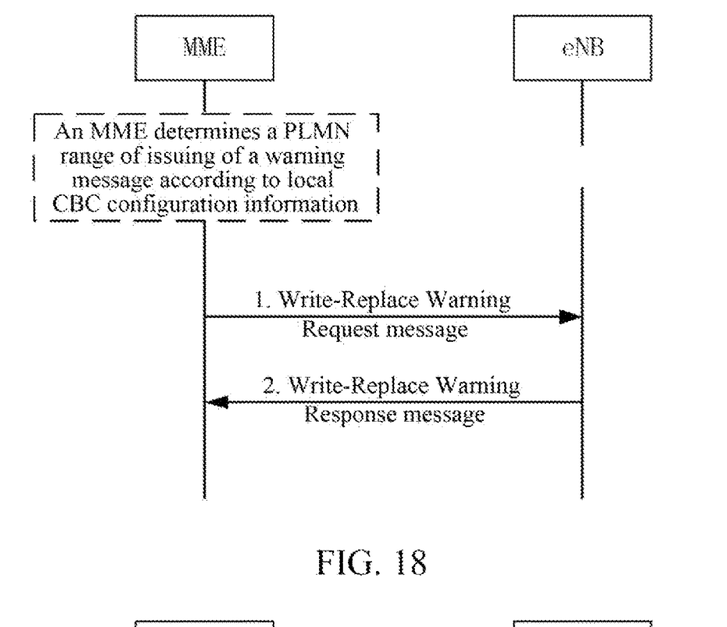
FIG. 18 is a flowchart of issuing a warning message according to a third alternative embodiment of the present document.

FIG. 18 is a flowchart of issuing a warning message according to a third alternative embodiment of the present document, and as shown in FIG. 18, the flow is described as follows.

1) An MME sends a write-replace warning request message to an eNB to request for issuing a warning message for broadcasting. The message may include an attribute of the warning message, for example: a message identifier IE and serial number IE identifying the warning message, and/or a warning area IE indicating a warning area of the warning message, and/or a repetition period IE indicating a broadcast period of the warning message, and/or a number of broadcast requested IE indicating the number of broadcasting times of the message. Herein, warning area information may be extended in the abovementioned manner.

2) The eNB sends a write-replace warning response message to the MME. The message includes the message identifier IE and serial number IE identifying the warning message, and/or warning area information, i.e. a broadcast completed area list IE, indicating successful completion of issuing of the warning message. Herein, the warning area information for successful completion of issuing of the warning message may be added with PLMN list information, which indicates a PLMN range where issuing of the warning message has been completed.

It is important to note that the MME may perform the following operation before step 1) in the alternative embodiment.

The MME determines a PLMN list which permits the warning message to be broadcasted according to locally configured connected CBC information, such as the PLMN list information to which the CBC belongs.

Figure 19:
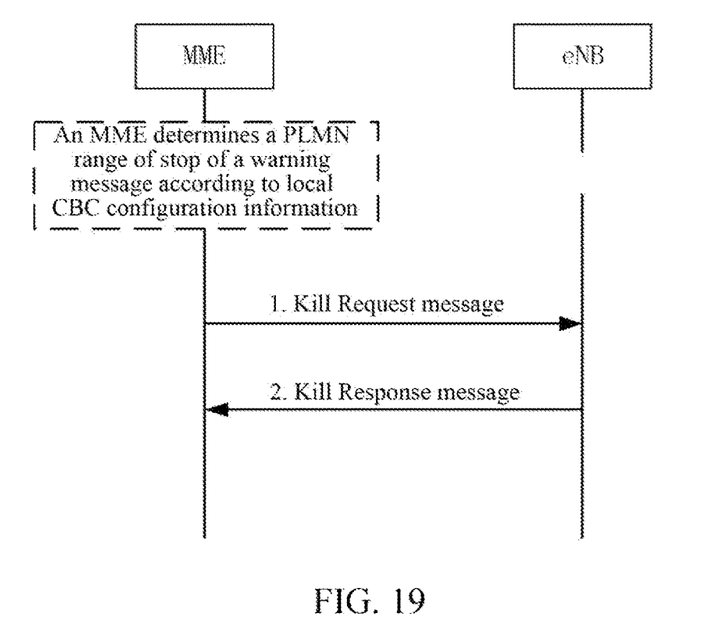
FIG. 19 is a flowchart of stopping a warning message according to a fourth alternative embodiment of the present document.

FIG. 19 is a flowchart of stopping a warning message according to a fourth alternative embodiment of the present document, and as shown in FIG. 19, the flow is described as follows.

1) An MME sends a kill request message to an eNB to request for stopping broadcasting of a warning message. The message may include an attribute of the warning message, for example: a message identifier IE and serial number IE identifying the warning message, and/or a warning area IE indicating a warning area where the warning message is stopped, and/or a kill-all warning messages indicator indicating whether to stop all warning messages in the eNB or not. Herein, warning area information may be extended in the abovementioned manner.

2) The eNB sends a kill response message to the MME. The message includes the message identifier IE and serial number IE identifying the warning message, and/or warning area information, i.e. a broadcast cancelled area list IE, indicating cancellation of the warning message. Herein the warning area information indicating cancellation of the warning message may be added with PLMN list information, which indicates a PLMN range where issuing of the warning message has been cancelled.

Herein, the MME may perform the following operation before step 1) in the alternative embodiment.

The MME determines a PLMN list which stops broadcasting of the warning message according to locally configured connected CBC information, such as the PLMN list information to which the CBC belongs.

Obviously, those skilled in the art should know that each module or each step of the abovementioned present document may be implemented by a universal computing device, they may be concentrated on a single computing device or distributed on a network formed by a plurality of computing devices, and they may optionally be implemented by program codes executable for the computing devices, so that they may be stored in a storage device for execution with the computing devices, the shown or described steps may be executed in sequences different from those described here in some circumstances, or they may form each integrated circuit module respectively, or multiple modules or steps therein may form a single integrated circuit module for implementation. As a consequence, the present document is not limited to any specific hardware and software combination.

The above is only the alternative embodiment of the present document and not intended to limit the present document, and for those skilled in the art, the present document may have various modifications and variations. Any modifications, equivalent replacements, improvements and the like within the spirit and principle of the present document shall fall within the scope of protection of the present document.

INDUSTRIAL APPLICABILITY

As mentioned above, the embodiment of the present document provides the method and apparatus for processing the warning message, the MME, the CBC and the base station. The problem that warning by distinguishing PLMNs cannot be performed in a network sharing environment in the related technology is solved, and effects of processing the warning message according to the PLMNs in the network sharing environment and better perfecting a warning system are further achieved.

What we claim is:

1. A method for processing a warning message, comprising:
    issuing a first request message for requesting for broadcasting a warning message to a base station, wherein a warning area range in the first request message comprises Public Land Mobile Network (PLMN) information; and
    receiving a first response message sent by the base station, wherein the first response message carries the PLMN information corresponding to issuing of the warning message;
    wherein, the PLMN information comprises a combination of a PLMN list, which permits the warning message to be broadcasted, and indication information about broadcasting with a PLMN range; and
    wherein the PLMN information is used to instruct the base station to broadcast the warning message.

2. The method according to claim 1, wherein, after issuing the first request message for requesting for broadcasting the warning message to the base station, the method further comprises:
    sending a second request message for requesting for stopping broadcasting the warning message to the base station; and
    receiving a second response message sent by the base station, wherein the second response message carries PLMN information corresponding to stopping broadcasting of the warning message.

3. The method according to claim 1, wherein, before issuing the first request message for requesting for broadcasting the warning message to the base station, the method further comprises at least one of:
    acquiring the PLMN information comprised in the warning area range from a Cell Broadcast Center (CBC) through an SBc interface; and
    acquiring the PLMN information comprised in the warning area range through locally stored CBC configuration information.

4. The method according to claim 2, wherein, before issuing the first request message for requesting for broadcasting the warning message to the base station, the method further comprises at least one of:
    acquiring the PLMN information comprised in the warning area range from a Cell Broadcast Center (CBC) through an SBc interface; and
    acquiring the PLMN information comprised in the warning area range through locally stored CBC configuration information.

5. The method of claim 1, wherein the PLMN information further comprises at least one of: a cell Identifier (ID) list, a Tracking Area ID list, and an emergency area ID list.

6. A method for processing a warning message, comprising:
    issuing a first request message for requesting for broadcasting a warning message to a Mobility Management Entity (MME) wherein a warning area range in the first request message comprises Public Land Mobile Network (PLMN) information; and
    receiving a confirm message sent by the MME, wherein the confirm message carries at least one of: the PLMN information corresponding to issuing of the warning message, PLMN information unidentified by the MME, and corresponding PLMN information unable to be sent by the MME;
    wherein, the PLMN information comprises a combination of the PLMN list, which permits the warning message to be broadcasted, and indication information about broadcasting with a PLMN range; and wherein the PLMN information is used to instruct a base station to broadcast the warning message.

7. A method for processing a warning message, comprising:
receiving a first request message used for requesting for broadcasting a warning message and issued by a Mobility Management Entity (MME) wherein a warning area range in the first request message comprises Public Land Mobile Network (PLMN) information; wherein, the PLMN information comprises a combination of the PLMN list, which permits the warning message to be broadcasted, and indication information about broadcasting with a PLMN range;
broadcast the warning message according to the PLMN information; and
sending a first response message to the MME, wherein the first response message carries the PLMN information corresponding to issuing of the warning message.

8. The method according to claim 7, wherein, after receiving the first request message used for requesting for broadcasting the warning message and issued by the MME, the method further comprises:
receiving a second request message used for requesting for stopping broadcasting the warning message and sent by the MME; and
sending a second response message to the MME, wherein the second response message carries PLMN information corresponding to stopping broadcasting of the warning message.

9. An apparatus for processing a warning message, comprising hardware performing instructions stored in a non-transitory computer readable medium which executes steps in following modules:
a first sending module, arranged to issue a first request message for requesting for broadcasting a warning message to a base station, wherein a warning area range in the first request message comprises Public Land Mobile Network (PLMN) information; and
a first receiving module, arranged to receive a first response message sent by the base station, wherein the first response message carries the PLMN information corresponding to issuing of the warning message;
wherein, the PLMN information comprises a combination of the PLMN list, which permits the warning message to be broadcasted, and indication information about broadcasting with a PLMN range; and
wherein the PLMN information is used to indicate the base station to broadcast the warning message.

10. The apparatus according to claim 9, wherein the hardware performing the instructions stored in the non-transitory computer readable medium further executes steps in following modules:
a second sending module, arranged to send a second request message for requesting for stopping broadcasting the warning message to the base station; and
a second receiving module, arranged to receive a second response message sent by the base station, wherein the second response message carries PLMN information corresponding to stopping broadcasting of the warning message.

11. The apparatus according to claim 9, wherein the hardware performing the instructions stored in the non-transitory computer readable medium further executes steps in at least one of following modules:

a first acquisition module, arranged to acquire the PLMN information comprised in the warning area range from a Cell Broadcast Center (CBC) through an SBc interface; and
a second acquisition module, arranged to acquire the PLMN information comprised in the warning area range through locally stored CBC configuration information.

12. A Mobility Management Entity (MME), comprising the apparatus according to claim 9.

13. The apparatus of claim 9, wherein the PLMN information further comprises at least one of: a cell Identifier (ID) list, a Tracking Area ID list, and an emergency area ID list.

14. A Mobility Management Entity (MME) comprising the apparatus according to claim 10.

15. An apparatus for processing a warning message, comprising hardware performing instructions stored in a non-transitory computer readable medium which executes steps in following modules:
a third sending module, arranged to issue a first request message for requesting for broadcasting a warning message to a Mobility Management Entity (MME) wherein a warning area range in the first request message comprises Public Land Mobile Network (PLMN) information; and
a third receiving module, arranged to receive a confirm message sent by the MME, wherein the confirm message carries at least one of: the PLMN information corresponding to issuing of the warning message, PLMN information unidentified by the MME, and corresponding PLMN information unable to be sent by the MME;
wherein, the PLMN information comprises a combination of the PLMN list, which permits the warning message to be broadcasted, and indication information about broadcasting with a PLMN range; and
wherein the PLMN information is used to indicate a base station to broadcast the warning message.

16. A Cell Broadcast Center (CBC) comprising the apparatus according to claim 15.

17. An apparatus for processing a warning message, comprising hardware performing instructions stored in a non-transitory computer readable medium which executes steps in following modules:
a fourth receiving module, arranged to receive a first request message used for requesting for broadcasting a warning message and issued by a Mobility Management Entity (MME) wherein a warning area range in the first request message comprises Public Land Mobile Network (PLMN) information; and
a fourth sending module, arranged to send a first response message to the MME, wherein the first response message carries the PLMN information corresponding to issuing of the warning message;
wherein, the PLMN information comprises a combination of the PLMN list, which permits the warning message to be broadcasted, and indication information about broadcasting with a PLMN range; and
wherein the PLMN information is used to indicate the apparatus to broadcast the warning message.

18. The apparatus according to claim 17, wherein the hardware performing the instructions stored in the non-transitory computer readable medium further executes steps in following modules:

a fifth receiving module, arranged to receive a second request message used for requesting for stopping broadcasting the warning message and sent by the MME; and a fifth sending module, arranged to send a second response message to the MME, wherein the second response message carries PLMN information corresponding to stopping broadcasting of the warning message.

19. A base station, comprising the apparatus according to claim 17.

20. A base station, comprising the apparatus according to claim 18.

* * * * *